(12) United States Patent
Biddle (10) Patent No.: US 9,058,429 B2
(45) Date of Patent: Jun. 16, 2015

(54) USABILITY TESTING TOOL

(76) Inventor: Toby Biddle, South Melbourne (AU)

(*) Notice: Subject to any disclaimer, the term of this patent is extended or adjusted under 35 U.S.C. 154(b) by 175 days.

(21) Appl. No.: 13/503,020

(22) PCT Filed: Aug. 31, 2010

(86) PCT No.: PCT/AU2010/001120
§ 371 (c)(1),
(2), (4) Date: Apr. 19, 2012

(87) PCT Pub. No.: WO2011/054024
PCT Pub. Date: May 12, 2011

(65) Prior Publication Data
US 2012/0210209 A1    Aug. 16, 2012

(30) Foreign Application Priority Data

Nov. 6, 2009  (AU) ................. 2009905430
Jul. 13, 2010  (AU) ................. 2010903113

(51) Int. Cl.
*G06F 11/36*    (2006.01)
(52) U.S. Cl.
CPC .................. *G06F 11/3688* (2013.01)
(58) Field of Classification Search
CPC .................................................. G06F 17/2235
USPC ......................................................... 715/205
See application file for complete search history.

(56) References Cited

U.S. PATENT DOCUMENTS

| | | | |
|---|---|---|---|
| 6,526,562 B1 | 2/2003 | Haddad et al. ................. 716/18 |
| 6,662,217 B1 * | 12/2003 | Godfrey et al. ............... 709/219 |
| 7,072,951 B2 * | 7/2006 | von Klopp et al. ........... 709/219 |
| 7,181,360 B1 * | 2/2007 | Nikolac et al. ................ 702/119 |
| 7,412,349 B2 * | 8/2008 | Moser et al. .................. 702/182 |
| 7,664,990 B2 * | 2/2010 | Kodaka et al. ............... 714/38.1 |
| 7,730,352 B2 * | 6/2010 | Marquardt et al. ............. 714/27 |
| 7,849,447 B1 * | 12/2010 | Karis et al. .................... 717/125 |
| 8,370,929 B1 * | 2/2013 | Pennington et al. ............ 726/22 |

(Continued)

FOREIGN PATENT DOCUMENTS

| | | |
|---|---|---|
| WO | 00/26836 | 5/2000 |
| WO | 01/57706 | 1/2001 |

(Continued)

OTHER PUBLICATIONS

Eksioglu et al., Heuristic Evaluation and Usability Testing: Case Study, Springer 2011, pp. 143-151.*

(Continued)

*Primary Examiner* — Cong-Lac Huynh
(74) *Attorney, Agent, or Firm* — Ladas & Parry, LLP (57) ABSTRACT

Systems, methods and apparatus for usability testing of remote interfaces or online applications via a user test application are disclosed. A parser of the user test application receives an HTTP request for a page of the interface or application to be tested from an evaluating participant. The parser creates an iframe that contains a URL of the user test application with a task URL related to the remote interface or online application to be tested appended to the URL. An HTTP request is made to the interface or online application based on the HTTP request and the user test application processes an HTTP response from the interface or online application and transmits the HTTP response to the participant as if the participant made the request directly from the remote interface or online application.

24 Claims, 8 Drawing Sheets

(56) References Cited

U.S. PATENT DOCUMENTS

| | | | |
|---|---|---|---|
| 2002/0065911 A1* | 5/2002 | von Klopp et al. | 709/224 |
| 2004/0268312 A1* | 12/2004 | Abe et al. | 717/124 |
| 2005/0086643 A1* | 4/2005 | Shane | 717/124 |
| 2005/0102611 A1* | 5/2005 | Chen | 715/513 |
| 2006/0117055 A1* | 6/2006 | Doyle | 707/102 |
| 2006/0117388 A1 | 6/2006 | Nelson et al. | 726/25 |
| 2007/0209010 A1 | 9/2007 | West | 715/762 |
| 2008/0127097 A1* | 5/2008 | Zhao et al. | 717/124 |
| 2008/0281944 A1* | 11/2008 | Vorne et al. | 709/218 |
| 2009/0013398 A1* | 1/2009 | Cookmeyer et al. | 726/11 |
| 2009/0024801 A1* | 1/2009 | Choi et al. | 711/144 |
| 2009/0094514 A1* | 4/2009 | Dargahi et al. | 715/255 |
| 2009/0240759 A1* | 9/2009 | Miyamoto et al. | 709/201 |
| 2010/0146396 A1* | 6/2010 | Able et al. | 715/735 |
| 2010/0153782 A1* | 6/2010 | Chandra | 714/37 |
| 2011/0022899 A1* | 1/2011 | Greenberg et al. | 714/47 |
| 2011/0067004 A1* | 3/2011 | Birsan et al. | 717/125 |
| 2011/0161825 A1* | 6/2011 | Tierney et al. | 715/736 |
| 2011/0214058 A1* | 9/2011 | Duffie et al. | 715/704 |
| 2011/0321162 A1* | 12/2011 | Gluck | 726/22 |
| 2012/0324358 A1* | 12/2012 | Jooste | 715/733 |
| 2013/0130211 A1* | 5/2013 | Dohring et al. | 434/157 |
| 2013/0160131 A1* | 6/2013 | Madou et al. | 726/25 |
| 2013/0290403 A1* | 10/2013 | Wei | 709/203 |
| 2014/0007055 A1* | 1/2014 | Tran | 717/124 |

FOREIGN PATENT DOCUMENTS

| | | |
|---|---|---|
| WO | 02/08903 | 7/2001 |
| WO | 2004/012126 | 7/2003 |

OTHER PUBLICATIONS

H et al., User Experience: Assessing the Effectiveness of Internet Booking Service, IEEE 2010, pp. 1-6.*

Hong et al., WebQuilt: a Proxy-based Approach to Remote Web Usability Testing, ACM 2001, pp. 263-285.*

ISR and IPRP for PCT/AU2010/001120 issued on Nov. 23, 2010 and Mar. 7, 2012.

PCT Written Opinion mailed on Nov. 23, 2010 from corresponding PCT Application No. PCT/AU2010/001120.

* cited by examiner

USABILITY TESTING TOOL

CROSS-REFERENCE TO RELATED APPLICATIONS

This application is the U.S. National Stage of International Patent Application No. PCT/AU2010/001120 filed on Aug. 31, 2010, which claims priority to Australian Patent Applications Nos. 2009905430 filed on Nov. 6, 2009 and 2010903113 filed on Jul. 13, 2010, the disclosures of which are hereby incorporated by reference in their entireties.

FIELD OF THE INVENTION

This invention relates to a usability testing tool and in particular to methods and systems for testing the usability of any digital interface such as, but not limited to websites, intranets, mobile applications, wireframes.

BACKGROUND TO THE INVENTION

It is a common step in the process of designing digital interfaces, such as web design and website building, that the product will be tested during development and before launch. This step involves ensuring that the proposed website or interface has no problems and functions as it should and that it can be used easily by customers.

Usability testing is often conducted by a third party who is not linked to the owner/developer of the interface. Information is provided by the interface owner/developer and the third party develops testing methods that will assess the usability of the interface. These testing methods include materials such as questionnaires and task scenarios. The testing materials are provided to a small group of 'participants' who conduct the tests according to the parameters set out in the test materials. After the tests are run, results are collated and reports are generated by the third party and presented in a way the owner/developer can understand so that the owner/developer can determine what changes should be made to the interface to improve its usability. Typically testing is conducted "face-to-face", i.e. the third party physically observes how the participants interact with the interface being tested. However, this method is time consuming and cost prohibitive to the majority of interface owners/developers. Another drawback is that it produces qualitative results with a high standard error that cannot always be relied upon as being perfectly accurate.

Other known methods of usability testing are not conducted face-to-face, but are conducted over a communications network, such as the Internet. Participants test the digital interfaces via their computing devices, for example from their own homes or offices. However, such methods typically require a block of Java code to be added to every page comprising the website being tested, which can be both time consuming and costly to add, particularly where websites have many constituent web pages.

Another drawback is that such methods require participants to download an application or the like to their computing device to enable the participants' interaction with the interface to be monitored by the third party. Many participants are wary of downloading such applications fearing that a virus and/or malware and/or adware may also be downloaded and infect or otherwise corrupt their computing device and/or compromise their confidential personal information. Hence, many are reluctant to participate in usability testing.

Google Analytics is one example of an online usability testing tool that requires the insertion of code on the website to be tracked and/or requires participants to download a small program to their computer for the interactions to be tracked. This is necessary so the tracked website can 'talk' to the data collection website. To insert code on the website to be tracked necessitates having access to the source code of the website. Hence, testing is limited to one's own website or one to which back-end access is provided, such as a client's website. This solution typically also has lower response rates of usability evaluations because of the aforementioned concern regarding viruses, malware and/or adware.

Some usability testing tools use path analysis and log files, such as embodiments of the methods and apparatus disclosed in International patent applications WO 01/57706 and WO 02/08903 in the name of Vividence Corporation. Whilst such methods and apparatus provide a useful usability testing solution, the use of server log files does not always yield meaningful usability data. Log files can only report requests to the server. Therefore, if a user's network or ISP has, for example, cached a copy of the relevant webpage, a subsequent request for that webpage will not have a corresponding log entry. Therefore usability data derived from the log file will be inaccurate because it will not be based on an accurate account of the user's requests. There are also limitations on the extent of usability information that log fields can provide. For example, generally log files do not indicate what a user is looking for, whether it was easy to find and whether it satisfied the user's objective.

U.S. Pat. No. 6,526,526 discloses a method, system and program for remote automated usability testing of a software application utilizing a data processing system connected within a network. A test wizard comprising scripting, measurement gathering and data transmission for the usability testing is activated while the software application is running. In some embodiments all data for controlling scripting is initially included with the text wizard. However, in other embodiments, additional data for scripting is provided via the network, which is likely to attract the aforementioned concern regarding viruses, malware and/or adware.

United States Patent Publication No. 2007/0209010 also discloses computer implemented systems and methods for testing the usability of software applications in which a web based test interface executes independently of the software application under test. The testing system has no programmatic interaction with the software application under test and information entered by the participant within the test interface is recorded by the testing program. US 2007/0209010 states that monitoring software does not need to be installed on the participant's computer, which may address the aforementioned concern regarding the risk of downloading viruses, malware and/or adware. US 2007/0209010 states that the disclosed systems and methods may be used to perform large-scale testing and to improve the reliability of measures beyond those possible in a typical quality lab environment.

Accordingly, it is an object of the present invention to overcome or at least ameliorate one or more of the disadvantages of the prior art.

SUMMARY OF THE INVENTION

Embodiments of the present invention provide systems, methods and apparatus for usability testing of remote interfaces or online applications via a user test application that do not require the downloading of an application or the like to the computers of the evaluating participants and that do not rely on the analysis of log files to derive meaningful and informative usability test data.

In one particular form, although not necessarily the broadest form, the invention resides in a method of usability testing of a remote interface or online application via a user test application, the method including:
  a parser of the user test application receiving from a participant an HTTP request for a page of the remote interface or online application to be tested;
  creating an iframe that contains a URL of the user test application with a task URL related to the remote interface or online application to be tested appended to the URL;
  the user test application making an HTTP request to the remote interface or online application based on the HTTP request; and
  the user test application processing an HTTP response from the remote interface or online application and transmitting the HTTP response to the participant as if the participant made the request directly from the remote interface or online application.

The HTTP request received from the participant may be in the form of one of the following: an action or process request; a resource request.

The method may include using a different URL of the user test application for actions or processes from a URL of the user test application used for resources.

Preferably, the method includes the user test application recording action requests of the participant as participant navigation actions of the remote interface or online application, which are subsequently processed by the parser.

Preferably, the method includes the parser processing resource requests of the participant.

Suitably, HTTP resource requests are processed based on the HTTP response header mime type.

In another form, the invention resides in a parser of a user test application comprising computer readable program code components configured to cause the performance of the aforementioned usability testing of a remote interface or online application.

According to a further form, the present invention provides a method for testing remote interfaces and online applications, the method including:
  providing an accessible user interface on a communications network;
  providing a communication means to users;
  providing a login point for users; and
  a reporting means;
  wherein a report on the interface is generated, when a user accesses the user interface through the login point; and
  whereby a user can generate a usability report on a website independently by using a web based application that allows the user to script scenarios and questions for usability testing and distribute these to a hand picked group or randomly generated sample of participants.

According to a yet further form, the invention provides a method of usability testing in an online environment including:
  a first party self defining an online review means of an remote interface or online application of the first party or a third party and defining selected participants to undertake review of the remote interface or online application;
  providing a plurality of second parties with a link to the online review means to undertake review of the remote interface or online application;
  the plurality of second parties undertaking review of the remote interface or online application of the first party or the third party and completing the online review means; and
  the first party receiving a report of the online review according to its defined online review means from the plurality of second parties that have undertaken the review of the remote interface or online application of the first party or the third party.

In another form, the invention provides a usability tool for a party to self define a tool for determining the usability of a remote interface or online application, the usability tool comprising:
  an online means having:
    a definable survey questionnaire including a range of predefined analytical categories for assessing the usability of a remote interface or online application; and
    a definable selection of predefined or definable participants to undertake review of the remote interface or online application and complete the questionnaire; and
  a communication means:
    for sending the defined questionnaire to the selected participants to review the usability of the interface or online application.
Suitably, the online means has:
  a communication means for receiving completed defined questionnaires from the selected participants on reviewing the usability of the remote interface or online application; and
  an analysis means for analysing a plurality of received completed questionnaires and providing a report;
  whereby the usability tool enables self assessment of the usability of the remote interface or online application with a definable survey questionnaire including a range of predefined analytical categories for assessing the usability of the remote interface or online application and a definable selection of predefined or definable participants to undertake review of the online interface or application and complete the questionnaire.

According to yet another form, the invention provides a method of determining a usability tool including the steps of:
  providing a plurality of categories of assessment questions in order to assess the usability of a remote interface or online application;
  providing a database of test questions for each of the categories of assessment questions;
  receiving user defined test questions in at least one of the categories of assessment questions;
  providing a flow report for coordinating the categories of assessment and the selected test question, modified test question or user defined test question in order to undertake a usability assessment of the remote interface or online application; and
  creating a questionnaire in accordance with the flow report; whereby the questionnaire provides instructions and questions in order to undertake a usability assessment of the remote interface or online application.
Suitably, the method includes the steps of:
providing receiving input means for receiving a plurality of completed questionnaires;
analysing automatically the plurality of completed questionnaires; and
providing a report on the outcome to provide a usability assessment of the remote interface or online application.

Further forms and features of the present invention will become apparent from the following detailed description.

It can therefore be seen that embodiments of the invention also enable anyone who wants to have professional usability testing conducted to avoid the need for external usability consultancy that will prepare and conduct the research on their behalf. The embodiments of the invention enable people to conduct their own usability testing online, without the need or help of a consultant.

BRIEF DESCRIPTION OF THE DRAWINGS

In order that the invention may be more readily understood, an embodiment will be described by way of illustration only with reference to the drawings wherein.

DESCRIPTION OF A PREFERRED EMBODIMENT OF THE INVENTION

Figure 1:
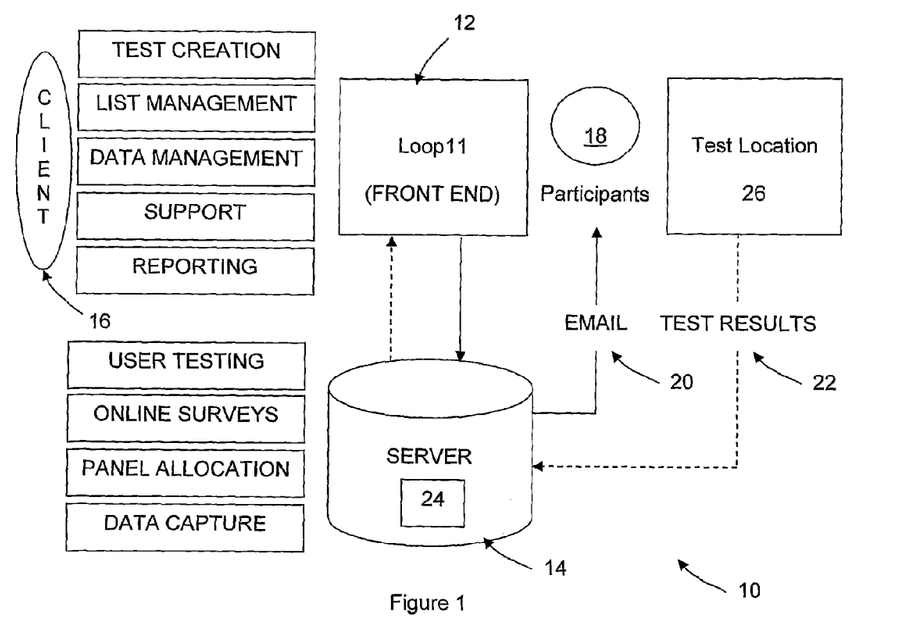
FIG. 1 is a diagrammatic view of a usability tool and method of creation and use in accordance with an embodiment of the invention.

Referring to the drawings and particularly FIG. 1 there is shown in one particular form of the invention a usability tool 10 for a party to self define a tool for determining the usability of a remote interface or online application. The usability tool 10 comprises an online means 12 for providing a definable survey questionnaire including a range of predefined analytical categories for assessing the usability of the interface or online application and a definable selection of predefined or definable participants to undertake review of the interface or online application and complete the questionnaire.

Firstly at online means 12 in the form of a front end of the usability tool provided by the test server 14, the client 16 undertakes test creation, list management, data management, support and reporting requirements. This matter is sent online to a creation tool product in the test server 14 that, in response to user inputs, creates user testing, online surveys and/or questionnaires, allocation of one or more participants 18, such as a panel of participants and data capture means for responses.

By way of a communication means, which can be in the form of email 20 to the participants, the user defined questionnaire or survey is sent to the selected participants 18 to facilitate review of the usability of a defined interface or online application.

The communication means also transmits test results 22 in the form of completed defined questionnaires from the selected participants 18 on reviewing the usability of the interface or online application to the test server 14.

An analysis means 24 for analysing a plurality of received completed questionnaires provides a report back to the user via the front end.

In this preferred embodiment, the invention provides an online web application specifically designed to enable individuals and businesses to conduct usability studies, as well as other website-specific and 'user experience' research.

The web application is a fully self-serve website providing the ability for account holders to script their own task scenarios and questions, access research panel participants and launch a survey in order to assess the usability of their own, or someone else's, interface.

At a high level the workflow includes:
1. Client purchases access to the website or other e-commerce application.
2. Once purchase confirmation is received an email with a receipt and access details are emailed to client.
3. Client logs into the website and uses the tool to create a user test.
4. Client selects automated list or uploads their own panel list (these people are the participants).
5. Website emails panel with link to test location 26 and access to the usability test.
6. Once completed, results and findings are sent back to the database.
7. After the completion date the client can then access the data via the website, run reports and export.
8. After a set period client access is removed, but the data is stored within database.

The following additional modules can be added:
Purpose of visit
Card Sorting
Information Architecture Validation The improvements/advantages of the invention include that it will allow account holders to conduct user defined testing. It will be a significantly cheaper alternative which will allow for more regular and frequent testing than would otherwise be the case.

Definitions, Acronyms, and Abbreviations

The following table shows the meanings of words, names etc. used for embodiments of the invention.

Note: This is to be done progressively as new words arise.

| # | Word | Meaning |
|---|------|---------|
| 1 | Input elements | Key entry point to unique page |
| 2 | Output elements | Key exit to unique page |
| 3 | Unique Page | Stand alone page which looks like no other in design |
| 4 | Component | Key page item, which can be used across multiple pages, including unique items (e.g.: search field) |
| 5 | Pre-filled | Page that has saved data already entered by the user |
| 6 | Empty | New page that has empty fields which require data to be entered by the user |
| 7 | User Tables | Means activity by the user occurs on current page |
| 8 | System Table | Means activity has already been completed by the user and navigation can occur via saved data/processes |
| 9 | Participants | The end users who actually completed the test |

The invention is characterized by being a web based application with a self serving capability that is easy to use. The following table identifies items which are preferred in a first embodiment of the invention:

Access

1. Client logs onto the website and completes registration form
2. Client pays to gain access to the invention
3. Email is sent to client with access details
4. Client returns to the website and logs-in

Setting up and monitoring

1. Create user test filename. This name is used to identify user tests. It is not to be seen by test participants.
2. Add a title. This is the name of the user test that participants will see.
3. Add a description. This is a description of the user test that participants see.
4. Add a task (participants only ever see one task at a time), including:
   URLs (not mandatory, must be able to have more than one)
   Ability to randomise tasks
5. Add follow-up questions, which may include:
   Long text, short text, radio buttons, open ended, tick box, etc.
6. Option to randomise answer choices
7. Option to make answering a question mandatory (i.e. participants can't continue until an answer is provided)
8. Option to make the final answer "Other, please specify"
9. Option to allow respondents to add their own comment about the task and/or question in an open-ended field
10. Use Wizards to guide user through these processes
11. Instructions for setting up the usability test
12. Allow users to change look and feel
13. Allow users to add their own logo
14. Allow deletion/editing of tasks and questions
15. Allow ability to move or copy a task/question to a different position in the user test
16. Ability to include skip logic for both tasks and questions
17. Include task and question numbering (question numbering restarts after each task)
18. Include progress bar
19. Add a 'Thank You' page.
20. WYSISYG Editor
21. Offer contextual Help. i.e. Help that relates only to the task/process currently being undertaken
22. Access to full FAQs and user manual
23. Select what type of test they want to create
24. Set up any tasks required
25. Must be able to upload images, documents, multimedia
26. Have the ability to link to any online interface
    For example, websites, intranet, mobile applications, wireframes
27. User must be able preview their user test at any time of creation
28. Auto-save functionality to ensure work is always saved
29. Allow user to come back and use previously created user test
30. Options to collect responses:
    Purchase survey respondents through online panel companies
31. Create a link to send in an email or place on a web page
32. Upload own emails to send link to
33. Create a pop-up link for a website
34. Enable basic data collection restrictions:
    Set a cut-off time and date
    Set a maximum response count
    Enable IP blocking to block or allow respondents from a particular IP range
    Option to restrict to one completed user test per PC.
    (Means an individual can't complete a user test multiple
35. Multi-lingual functionality
36. Option to redirect participants to a particular url upon completion of the user test
37. Retain the participants IP address in test results
38. After launch, no changes can be made to the user test

Reporting

1. Must be able to view progressive results during the survey
2. Export data in CSV, Spreadsheet, XML, HTML, PDF
3. Ability to exclude partially completed UT from the results
4. Have the ability to search down to individual, preference

Reporting (continued)

5. Full graphical reporting
6. Easy to read reporting in tables
7. Reporting metrics should include:
   Success, abandonment and fail percentages
   Number of Clicks to Complete a Task, including average number of clicks, maximum number of clicks and minimum number of clicks.
   Time taken to complete a Task, including average time, maximum time and minimum time.
   Detailed path analysis
   Screen capture playbacks
   Participant video and audio recording with playbacks
8. Aggregated clickstream data that can show most common path for each task
9. Basic percentages if questions have been included with tasks.
10. Click tracking to show where on a page people are clicking
11. 1st click data—what was the first click a user took for individual tasks
12. Ability to filter responses

Public Website

1. Animated Demonstration
2. Client list
3. Testimonials
4. Subscription details Examples of markets/companies which could use the usability tool include:

Agencies (sell the product onto an agency who uses the tool for their clients)
Business to Business (Wholesalers who sell to retailers)
Manufacturing Companies (large steel, automotive, technology)
Finance and Banking: banks, investment brokers etc.
Technology: interactive tools, systems companies etc.
Retail: From large retail chains, super stores and supermarkets However, it will be appreciated that the usability tool can also be used by individuals.

Output Elements
User

| Field | Data | Destination |
| --- | --- | --- |
| Create New Test Button | Clicking this button simply acknowledges the creation of a blank test | Create User Test Page |

System

| Field | Data | Destination |
| --- | --- | --- |
| Home | All data viewable on page, input and output elements etc | Home, but refreshed |
| Duplicate | Create an exact duplicate of saved user test | A duplicate survey is to be positioned in the results, or drafts, table in required order (newest to oldest etc) |
| Results Links (view report) | All results form completed user test | Analysis Page of specific user test |
| Results Links (delete) | Entire data from the completed user test | Pop-up Window asking for confirmation of delete. If confirmed all data is to be removed |

-continued

| Field | Data | Destination |
|---|---|---|
| Draft Links (edit) | All data entered and saved by the user | Step One: User Test Details of survey selected |
| Draft Links (delete) | All data entered and saved by the user | Pop-up Window asking for confirmation of delete. If confirmed all data is to be removed |
| My Project | All data that sits within the Results Table and the Draft Table | My Project Overview Page |

All outputs from this page must allow the use to reach any point in embodiments of the invention with a single click.

Data base is set up at this stage, capturing all user activity.

Each introduction page is unique to each account holder.

Common Questions and Help Links must be relevant for specific section.

Common Questions and Help Items will all be, HTML format.

Results and Draft tables are exactly replicated in the My Projects section.

Figure 2:
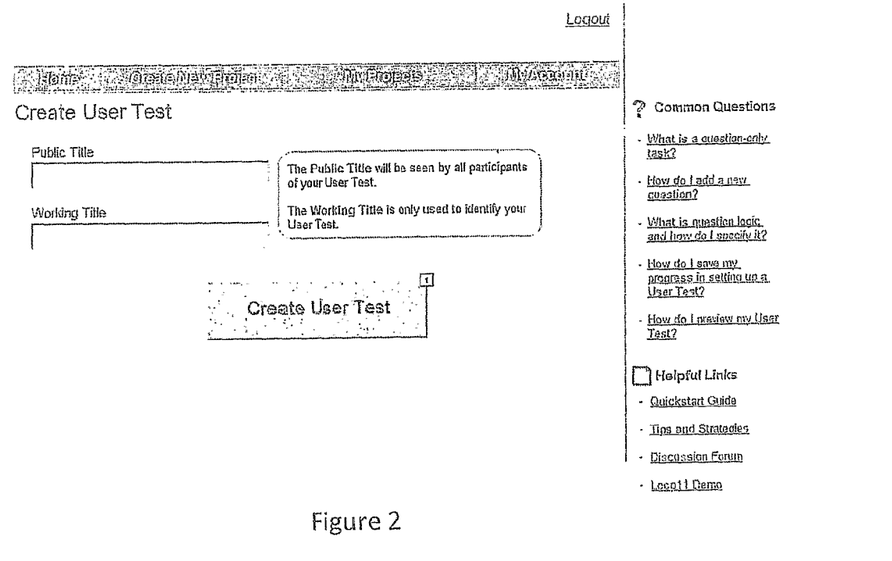
FIG. 2 is a page screen of a Create User Test screen of a usability tool and method of creation and use of FIG. 1.

An example of the user create test page is shown in FIG. 2. The output elements of this include:
User

| Field | Data | Destination |
|---|---|---|
| Public Title | Title Name | Front end interface participants will see |
| Working Title | Title Name | Back end administration title. |
| Create User Test | Titles and previous data | Step One: Create User Test |

System

| Field | Data | Destination |
|---|---|---|
| Create New Test | | |
| My Account | | |
| My Projects | | |
| Create User Test Button | Public Title Working Title | Public Title—Participant Test Interface Working Title—My Projects Admin or Reference Title |

Figure 3:
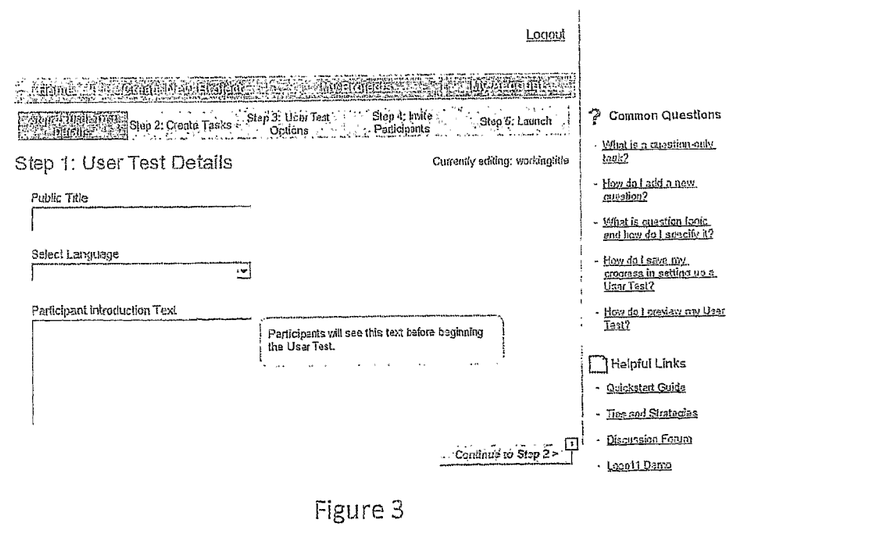
FIG. 3 is a page screen of a User Test details screen of a usability tool and method of creation and use of FIG. 1.

Both of these fields are mandatory and must be completed before clicking "create test" test button Common Questions and Help Links must be relevant for specific section Common Questions and Help Items will all be HTML format The user defined Create Tasks questionnaire creation is shown with particular reference to FIGS. 3 to 6. In Step 1 as shown in FIG. 3, this comprises the input elements of:
User

| Field | Data | Destination |
|---|---|---|
| Public Title | Title from previous page | Public User Test viewable by participants |

System

| Field | Data | Destination/Page Entry |
|---|---|---|
| Pre-filled User Test Details Page | Language Selected Public Title Participant Introduction Test | Back to Step 1 Button |

Output Elements
User

| Field | Data | Destination |
|---|---|---|
| Select Language | Selected language must apply on public facing interface. | Public testing interface and preview |
| Continue to Step 2 | Language Selected Public Title Participant Introduction Test | Step Two: Create Tasks Page |

System

| Field | Data | Destination/Page Entry |
|---|---|---|

Figure 4:
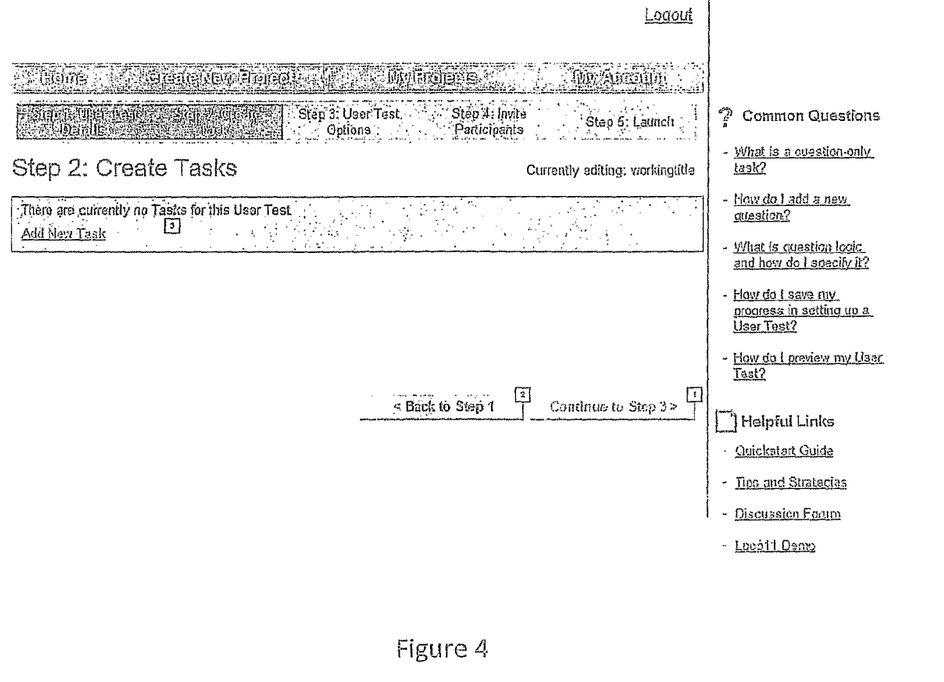
FIG. 4 is a page screen of a first Create Tasks screen of a usability tool and method of creation and use of FIG. 1.

When another language is selected it will not be viewable until a task has been added in Step 2, Create Test and previewed Public title is pre-filled however it can also be edited and automatically saved If the title is changed at this point, the change must occur throughout the entire system, especially when the user goes back and forth in the process Common Questions and Help Links must be relevant for specific section Common Questions and Help Items will all be HTML format Step 2: Task Overview Page (without Tasks) is Shown in FIG. 4 with the Following:
Input Elements:
System

| Field | Data | Destination |
|---|---|---|
| Step 2 | Language Selected Public Title Participant Introduction Test | Step 1 Page (pre-filled fields) |

Output Elements
User

| Field | Data | Destination |
|---|---|---|
| Add New Task Link | | Tasks Creation Fields (Empty) |

System

| Field | Data | Destination |
|---|---|---|
| Back to Step 1 | Language Selected Public Title Participant Introduction Test | Step 1 Page (pre-filled fields) |

Common Questions and Help Links must be relevant for specific section

Common Questions and Help Items will all be HTML format

Figure 5:
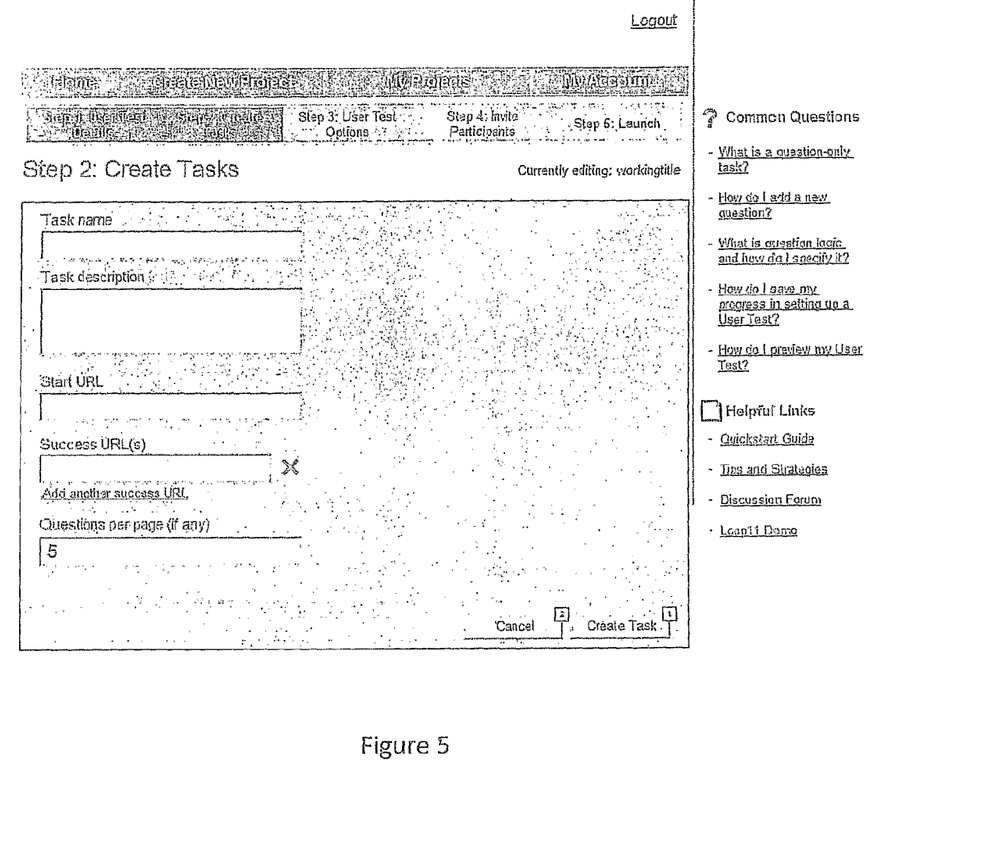
FIG. 5 is a page screen of a second Create Tasks screen of a usability tool and method of creation and use of FIG. 1.

Step 2 of the Actual Task Creation is Shown in FIG. 5 with the Following:

Input Elements:
System

| Field | Data | Destination |
| --- | --- | --- |
| Home | All saved data, maintained at their required location | Introduction Page |
| Step 2: Create Tasks, Add Tasks Button | Associate task against User Test set up | Present Page |

Output Elements
User

| Field | Data | Destination |
| --- | --- | --- |
| Create Task Button | Task name Task description Start URL Successful URL is input | Task Overview Page |
| Add another URL | | |
| Task Flow (Logic) | Must apply logic selected | Task Overview Page |

System

| Field | Data | Destination |
| --- | --- | --- |
| Back to Step 1 | Language Selected Public Title Participant Introduction Test | Step 1 Page (pre-filled fields) |
| Task Flow (Logic) | Must apply logic selected | Rest of Usability Test Introduction Page |
| Home | All saved data, maintained at their required location | |

Once a task is created it defaults to top position on list

Once data entered into field, it must be automatically saved

Common Questions and Help Links must be relevant for specific section

Common Questions and Help Items will all be HTML format

Figure 6:
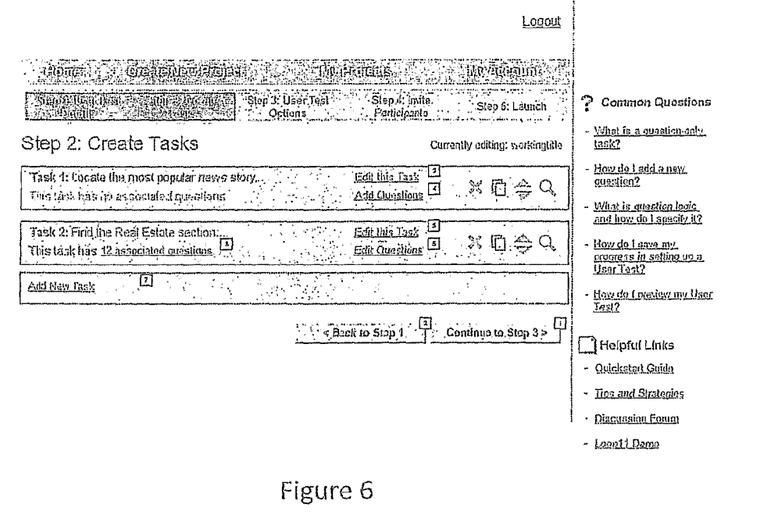
FIG. 6 is a page screen of a third Create Tasks screen of a usability tool and method of creation and use of FIG. 1.

Step 2 of Task Overview Page (with Tasks) is Shown in FIG. 6 with the Following:

Input Elements
User

| Field | Data | Destination |
| --- | --- | --- |
| Tasks | All task data is to be saved and made available through this interface | Task Overview Page |
| Order Arrows | All task data associated to the arrows | Up or Down in task order |

System

| Field | Data | Destination |
| --- | --- | --- |
| Back to Step 1 Button | All data created on this page must be stored | Step One: User Test Details Page (Pre-filled) |
| Tasks | All tasks created previous to this page are to be presented in above format | Task Overview Page |
| Tasks Position | All task data is to be saved presented in the order they were created | Task Overview Page |
| Order Arrows | All task data associated to the arrows | Up or Down in task order |

Output Elements
User

| Field | Data | Destination |
| --- | --- | --- |
| Add New Task | New task page (empty fields) | Create New Task Page |
| Preview Icon | All task data associated to Preview Icon | Preview Interface |
| Duplicate | Copy Entire Task | An exact copy of task is to appear directly below duplicate task |
| Add Questions Link | Must appear under the task which it is to be allocated through | Create a question page (empty fields) |
| Associated Questions Link | Existing Questions must be presented in order of which they are created | Task and Question Overview Page (pre-existing task and questions) |
| Edit Questions | Existing Questions must be presented in order of which they are created | Task and Question Overview Page (pre-existing task and questions) |
| Continue to Step 3 Button | All data created Tasks Questions Logics Account details | Step 3: Demographic Questions Page |

System

| Field | Data | Destination |
| --- | --- | --- |
| Edit | Copy Entire Task | Create Task Page (fields are pre-filled) |
| Duplicate | Copy Entire Task | An exact copy of task is to appear directly below duplicate task |
| Delete | Remove Entire Task form product | Pop-Up Window, asking for confirmation. Once confirmed - this is to no longer appear within the product |
| Associated Question Link | Existing Question must be presented in order of which they are created | Task and Question Overview Page |
| Edit Question Link | Existing Questions must be presented in order of which they are created | Task and Question Overview Page |
| Continue to Step 3 | All data created Tasks Questions Logics Account details | Step 3: Demographic Questions Page |

Once delete is selected a pop up window is to appear and ask "Are you sure you want to delete this task?"

Once delete is confirmed, tasks are to be removed completely from the invention product Preview buttons must present the task, as it would appear in the live environment. It must also allow the user to navigate around the rest of the user test while remaining in preview mode.

Common Questions and Help Links must be relevant for specific section

Common Questions and Help Items will all be HTML format

Step 2: Questions to Tasks Page (No Current Questions) (4)

Input Elements

System

| Field | Data | Destination |
|---|---|---|
| Task | All data already added and saved for task | Add Question Page |
| Questions Per Page | Must store this number of questions permitted after any task | |

Output Elements

User

| Field | Data | Destination |
|---|---|---|
| Add New Question Button | | |
| Finish Adding Question Button | | |

Common Questions and Help Links must be relevant for specific section

Common Questions and Help Items will all be HTML format

Figure 7:
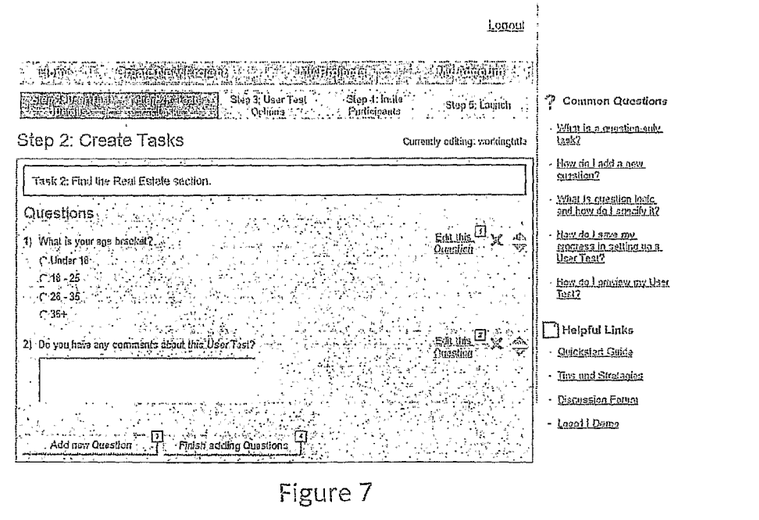
FIG. 7 is a page screen of a fourth Create Tasks screen of a usability tool and method of creation and use of FIG. 1.

Step 2: Questions to Tasks Page (with Questions) is Shown in FIG. 7 with the Following:

Input Elements

User

| Field | Data | Destination |
|---|---|---|
| Questions already created | Specific format for the question | |

System

| Field | Data | Destination |
|---|---|---|
| Questions already created | Specific format for the question | |

Output Elements

User

| Field | Data | Destination |
|---|---|---|
| Add A New Question Button | | |
| Finish Adding Question Button | | |

System

| Field | Data | Destination |
|---|---|---|
| Edit this Question | Question Data | Create Question Interface |
| Delete | Question Data | Pop-Up Window asking to confirm deletion If confirmed, remove question data completely |
| Order Arrows | All task data associated to the arrows | Up or Down in task order |

Common Questions and Help Links must be relevant for specific section

Common Questions and Help Items will all be HTML format

Step 3: User Test Options—Demographic Questions Page

Input Elements

Output Elements

User

| Field | Data | Destination |
|---|---|---|
| Continue to Step 4 Button | Capture all data user has inputted in Previous 3 steps | Step 4: Logo and Branding |
| Show . . . before User Test | Demographic Page and questions | Immediately after the end user sees the introduction |
| Show . . . after User Test. | Demographic Page and questions | After the user completed the last task and just before they view the thank you page |

System

| Field | Data | Destination |
|---|---|---|
| Back to Step 2 button | All completed data before the Step 3 Demographic page | Step 2: Task Overview Page (pre-filled) |
| Continue to Step 4 Button | Capture all data user has inputted in Previous 3 steps | Step 4: Logo and Branding |
| Show . . . before User Test | Demographic Page and questions | Immediately after the end user sees the introduction |
| Show . . . after User Test. | Demographic Page and questions | After the user completed the last task and just before they view the thank you page |

Step 3: Demographics is OPTIONAL

This is to be treated the same as a Question page

Common Questions and Help Links must be relevant for specific section

Common Questions and Help Items will all be HTML format

Figure 8:
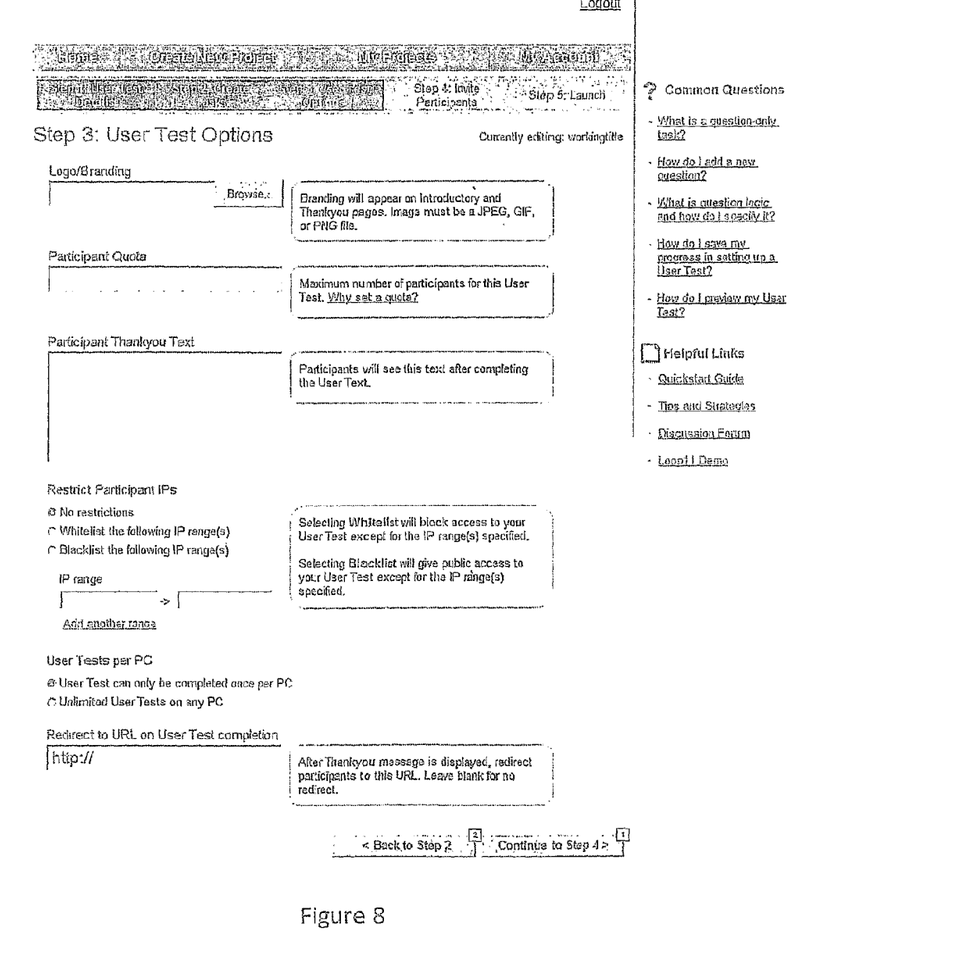
FIG. 8 is a page screen of a User Test Options screen of a usability tool and method of creation and use of FIG. 1.

Unique Page is Shown in FIG. 8 in which:

Common Questions and Help Links must be relevant for specific section

Common Questions and Help Items will all be HTML format

Step 5: Invite Participants

Only one of the above methods can be used per test

If a user wants to do more than one they must purchase another test

Only one of the radio buttons can be ticked at once

Common Questions and Help Links must be relevant for specific section

Common Questions and Help Items will all be HTML format

Figure 9:
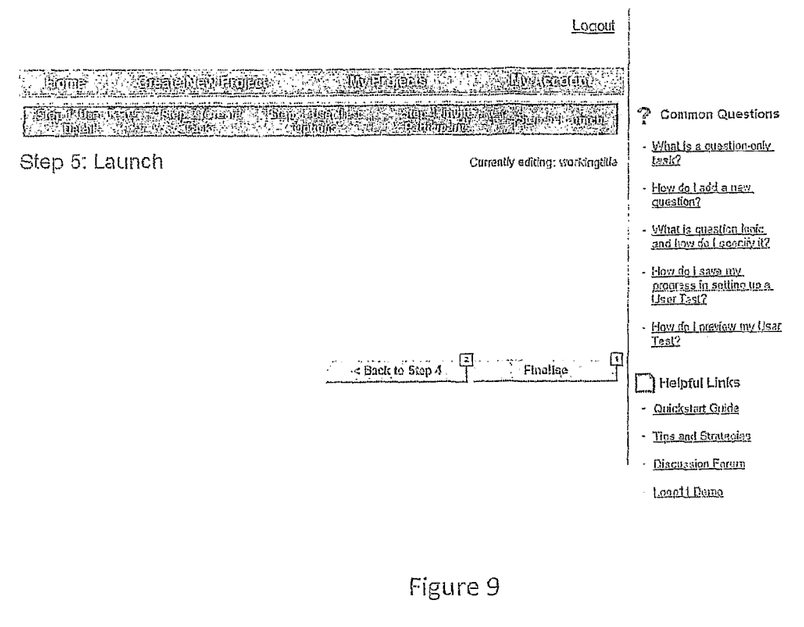
FIG. 9 is a page screen of a Launch of a create user defined questionnaire screen of a usability tool and method of creation and use of FIG. 1.

Unique Page shown in FIG. 9 has the following:

Input Elements

Common Questions and Help Links must be relevant for specific section

Common Questions and Help Items will all be HTML format

While we have described herein a particular embodiment of a usability tool, it is further envisaged that other embodiments of the invention could exhibit any number and combination of any one of the features previously described. However, it is to be understood that any variations and modifications can be made without departing from the scope of the present invention.

Figure 1A:
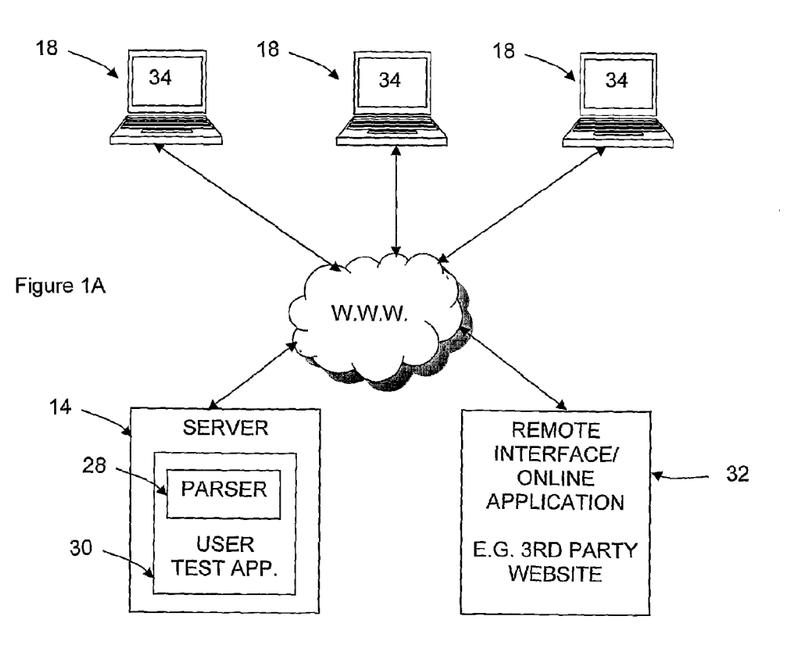
FIG. 1A is a schematic diagram showing a test server storing a user test application and participants testing a remote interface via their computing devices.

In particular, with reference to FIG. 1A, other embodiments of the present invention relate to a parser 28. For a user test application 30 known as loop[11], the parser 28 is a module within the loop[11] user test application 30, which resides on the test server 14. The user test application manages the user test and the parser 28 acts as a web proxy between the remote interface or online application 32, such as a third party website, and the client browser of the computer 34 of the user test participant 18.

The parser 28 is a module that is part of the user test application 30. The third party website 32 can be any website that is accessible via HTTP by the loop[11] user test server.

Figure 10:
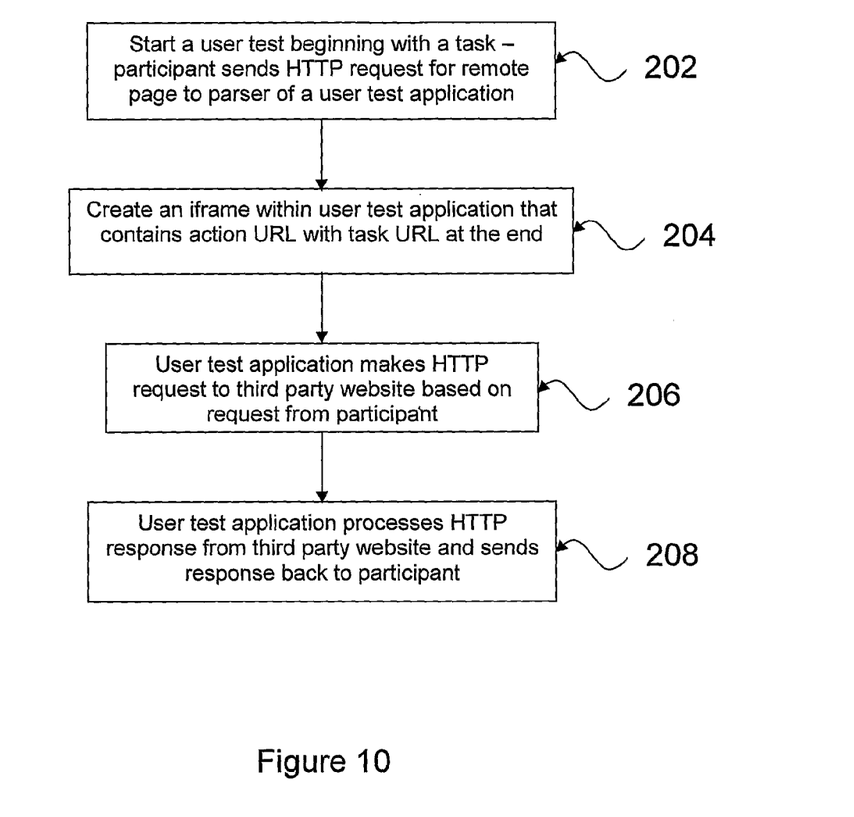
FIG. 10 is a general flow diagram illustrating operation of the usability tool.

With additional reference to the flow diagram of FIG. 10 illustrating the method 200 of operation of the parser, a user (participant 18) performing a user test via their computer 34 sends an HTTP request for a remote page to be tested as part of the usability test to the parser 28. This can be initiated simply by starting a user test that begins with a task, as shown at step 202. With reference to step 204, once the parser has received the HTTP request, the task URL is used to create an iframe within the user test application 30 that contains a loop[11] action URL with the task URL at the end (e.g. http://www.loop11.com/usertest/resource/http://website).

With reference to step 206, the user test application makes an HTTP request to the third party website 32 based on the request from the participant computer 34, which includes passing on relevant HTTP request headers. With reference to step 208, the user test application 30 processes the HTTP response from the third party website 32 and sends the response back to the participant computer 34 as if the participant made the request. The goal of this processing is for the user test application 30 to function as the original website 32 being tested. All subsequent requests are made through the loop[11] user test server 14 and domain, i.e. the loop[11] user test server acts as a web proxy between the participant client computer 34 and the third party website server.

External URLs can be requested from the parser 28 of the loop[11] user test server 14 in two ways—as an action or a resource. This is achieved by using a different loop[11] URL for actions and resources. For example, for actions the URL can be http://www.loop11.com/usertest/process/http://website. For resources, the URL can be http://www.loop11.com/usertest/resource/http://website.

The URL for the third party website 32 is added at the end of the loop[11] user test URL. Action requests can then be recorded as participant navigation actions by the loop[11] user test application 30 and then processed by the parser 28. Resources can be only processed by the parser.

To ensure the participant remains within the loop[11] user test application 30 and the page appears as if the participant is browsing it directly, any requested HTTP resource is handled based on its HTTP response header mime type in the ways discussed in the following paragraphs.

All HTML documents are processed and all URLs within the document are parsed. URLs that point to resources are resolved to their full path and, depending on the resource, may be resolved via a loop[11] URL so that they can in turn be processed, for example with Cascading Style Sheets (CSS) and JavaScript. For example an anchor element with the following href attribute:

<a href="http://www.google.com">google</a> would become:

<a href="http://vvww.loop11.com/process/http://www.google.com">google</a>

If the document contains CSS or JavaScript content, that content is processed by a respective processor. For example, CSS is processed to resolve all URLs to their full paths. JavaScript is processed to resolve all resource/action paths and to overwrite, or help overwrite, any JavaScript code that might modify the document or navigate, as discussed further below.

According to preferred embodiments, loop[11] user test application parser JavaScript is inserted into all HTML documents. This JavaScript executes on the browser on the participant's computer 34 and carries out the following:

Intercepts HTML writing and modifying functions and parses the HTML or HTML node before it is written or inserted into the document.

Intercepts any page navigation functionality and resolves the URL to a loop[11] action URL. This can include frame breaking, page navigation, new windows etc.

Intercepts dynamic JavaScript execution and sends it back to the loop[11] user test server 14 for processing as a JavaScript file.

Ensures that the page is within the loop[11] task iframe and performs a redirection back to the task if the page is not within the loop[11] task iframe.

HTTP headers are also processed. For example, cookie headers are modified to ensure the domain and path is within the loop[11] user test server 14.

Hence, in general, the parser 28 receives the HTTP request and with some modifications transmits the request to the remote web server. The parser then modifies the response from the remote server so that it can be served to the user as if it is coming from the remote interface/user application being tested while retaining the same look, function and content. This includes the HTTP headers as well as the content, based on the content type. Modification to the content includes resolving relative URLs for resources such as images and modifying all URLs that can lead to other page requests to point back to the user test application 30 and parser 28. The parser will also insert a client side script for intercepting and processing any scripts that may be on the page that make changes to the content or make HTTP requests. The parser 28 then sends the modified response back to the user computer 34.

Skilled addressees will appreciate that the test server 14 comprising the user test application 30 and the parser 28 comprises one or more processors operatively coupled to one or more storage media in the form of one or more memories. Each memory comprises a computer readable medium, such as a read only memory (e.g., programmable read only memory (PROM), or electrically erasable programmable read only memory (EEPROM)), a random access memory (e.g. static random access memory (SRAM), or synchronous dynamic random access memory (SDRAM)), or hybrid memory (e.g., FLASH), or other types of memory as are well known in the art. The computer readable medium comprises computer readable program code components to provide the usability tool and perform the methods of usability testing of remote interfaces and online applications etc. in accordance with the teachings of the present invention. At least some of the computer readable program code components are selectively executed by the one or more processors and are configured to cause the execution of the embodiments of the present invention described herein.

Hence, embodiments of the present invention enable owners and developers to test the usability of interfaces and applications etc. that they have developed more efficiently and at a lower cost than the prior art. Embodiments of the present invention benefit users and society as a whole by enabling users to conduct online usability testing of their websites without the need to have tracking java code script added to every page of their website and without the need to download applications which may contain a virus and/or malware and/or adware. Embodiments of the present invention thus contribute to the economic benefit of each country in which embodiments of the invention are implemented by facilitating the production of more thoroughly tested digital interfaces, such as websites intranets, mobile applications and wireframes more efficiently and at reduced cost compared with the prior art.

Furthermore, embodiments of the present invention enable users to conduct usability testing of remote interfaces and online applications of third parties, such as competitors, because back end access to such interfaces and applications is not required. Embodiments of the present invention provide comprehensive and meaningful usability testing results in real time that are more reliable than at least some of the prior art solutions.

Throughout the specification the aim has been to describe the invention without limiting the invention to any one embodiment or specific collection of features. Persons skilled in the relevant art may realize variations from the specific embodiments that will nonetheless fall within the scope of the invention.

The invention claimed is:

1. A method of usability testing of a remote interface or online application via a user test application, the method including:
   loading the user test application from a test server in a client browser of a participant;
   a parser of the user test application receiving from a the participant a first HTTP request for a page of the remote interface or online application to be tested;
   creating an iframe within the user test application that contains a URL of the user test application with a task URL identifying the page of the remote interface or online application to be tested appended to the URL;
   the user test application making a second HTTP request to the remote interface or online application based on the task URL; and
   the user test application processing an HTTP response from the remote interface or online application to the second HTTP request and transmitting the HTTP response to the participant via the iframe of the user test application as if the participant made the request directly from the remote interface or online application.

2. The method of claim 1, wherein the HTTP request is in the form of one of the following: an action, a process request or a resource request.

3. The method of claim 2, including using a different URL of the user test application for actions or processes from a URL of the user test application used for resources.

4. The method of claim 2, including the user test application recording action requests of the participant as participant navigation actions of the remote interface or online application, which are subsequently processed by the parser.

5. The method of claim 1, including the parser processing resource requests of the participant.

6. The method of claim 2, further including the parser processing HTTP resource requests based on the HTTP response header mime type.

7. The method of claim 1, including inserting code components into an HTML document requested by the participant, which executes on the browser on the participant's computer.

8. The method of claim 7, wherein execution of the inserted code components intercepts HTML writing and modifying functions and parses the HTML or HTML node before it is written or inserted into the document.

9. The method of claim 7, wherein execution of the inserted code components intercepts any page navigation functionality and resolves the task URL to an action URL of the user test application.

10. The method of claim 7, wherein execution of the inserted code components intercepts dynamic JavaScript execution and sends it back to the user test application for processing as a JavaScript file.

11. The method of claim 7, wherein execution of the inserted code components ensures that the HTML document is within the user test application task iframe and performs a redirection back to the task if the page is not within the user test application task iframe.

12. The method of claim 1, further including processing HTTP headers and modifying the HTTP headers if necessary to ensure the domain and path is within the user test application.

13. A non-transitory computer readable medium of a test server, the non-transitory computer readable medium comprising computer readable program code components for usability testing of a remote interface or online application, the computer readable program code components configured to cause:
   loading a user test application from the test server in a client browser of a participant;
   receiving from the participant a first HTTP request for a page of the remote interface or online application to be tested;
   creating an iframe within the user test application that contains a URL of the user test application with a task URL identifying the page of the remote interface or online application to be tested appended to the URL;
   making a second HTTP request to the remote interface or online application based on the task URL; and
   processing an HTTP response from the remote interface or online application to the second HTTP request and transmitting the HTTP response to the participant via the iframe of the user test application as if the participant made the request directly from the remote interface or online application.

14. The non-transitory computer readable medium of claim 13, wherein the first HTTP request is in the form of one of the following: an action, a process request or a resource request.

15. The non-transitory computer readable medium of claim 13, comprising computer readable program code components stored on the computer readable medium, the computer readable program code components configured to cause using a different URL of the user test application for actions or processes from a URL of the user test application used for resources.

16. The non-transitory computer readable medium of claim 13, comprising computer readable program code components stored on the computer readable medium, the computer readable program code components configured to cause recording action requests of the participant as participant navigation actions of the remote interface or online application, which are subsequently processed by the parser.

17. The non-transitory computer readable medium of claim 13, comprising computer readable program code components stored on the computer readable medium, the computer readable program code components configured to cause processing resource requests of the participant.

18. The non-transitory computer readable medium of claim 13, comprising computer readable program code components stored on the computer readable medium, the computer readable program code components configured to cause processing HTTP resource requests based on the HTTP response header mime type.

19. The non-transitory computer readable medium of claim 13, comprising computer readable program code components stored on the computer readable medium, the computer readable program code components configured to cause inserting code components into an HTML document requested by the participant, which executes on a browser on the participant's computer.

20. The non-transitory computer readable medium of claim 19, comprising computer readable program code components stored on the computer readable medium, the computer readable program code components configured to cause interception of HTML writing and modifying functions and parsing the HTML or HTML node before it is written or inserted into the document.

21. The non-transitory computer readable medium of claim 19, comprising computer readable program code components stored on the computer readable medium, the computer readable program code components configured to cause interception of any page navigation functionality and resolving the task URL to an action URL of the user test application.

22. The non-transitory computer readable medium of claim 19, comprising computer readable program code components stored on the computer readable medium, the computer readable program code components configured to cause interception of dynamic JavaScript execution and sending it back to the user test application for processing as a JavaScript file.

23. The non-transitory computer readable medium of claim 19, comprising computer readable program code components stored on the computer readable medium, the computer readable program code components configured to cause ensuring that the HTML document is within the user test application task iframe and performing a redirection back to the task if the page is not within the user test application task iframe.

24. The non-transitory computer readable medium of claim 19, comprising computer readable program code components stored on the computer readable medium, the computer readable program code components configured to cause processing HTTP headers and modifying the HTTP headers if necessary to ensure the domain and path is within the user test application.

* * * * *